Nov. 13, 1934.    A. F. ADKINS    1,980,947
EXPANDING BRAKE
Filed March 20, 1933    2 Sheets-Sheet 1
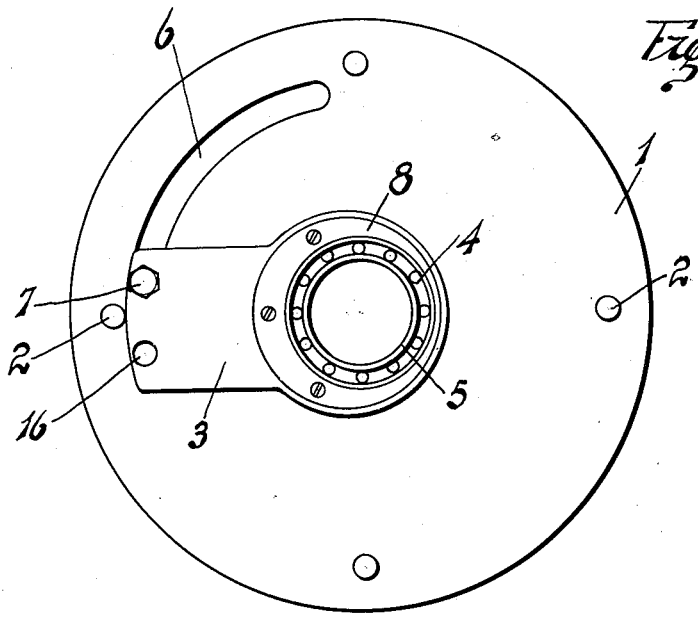
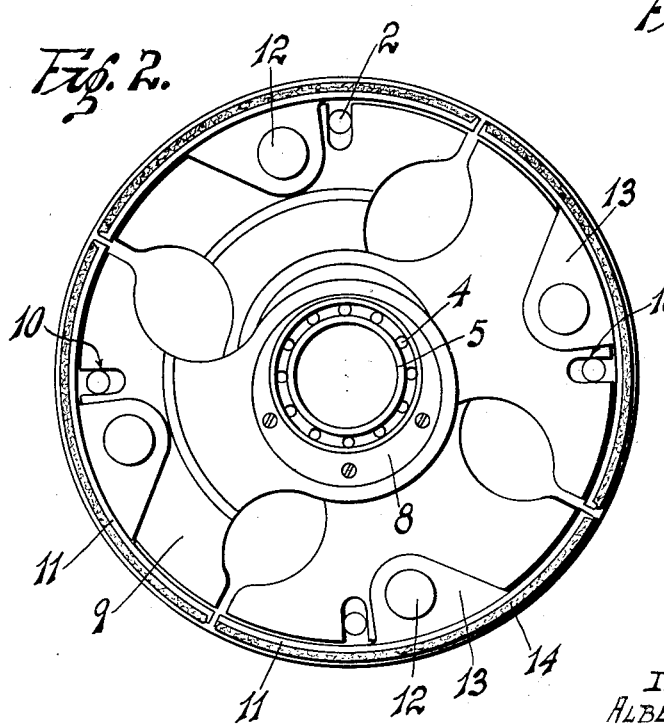
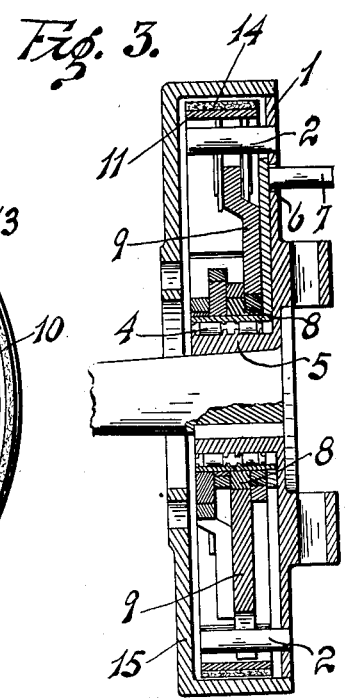
INVENTOR.
ALBERT F. ADKINS.
BY
H. A. Dreckman
ATTORNEY Nov. 13, 1934.    A. F. ADKINS    1,980,947
EXPANDING BRAKE
Filed March 20, 1933    2 Sheets-Sheet 2
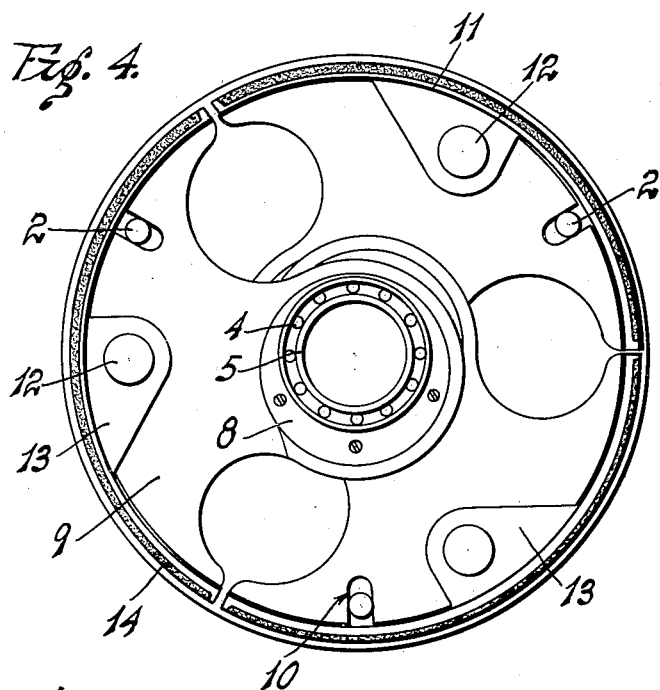
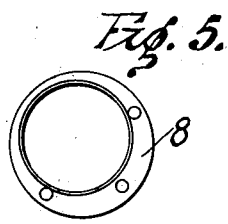
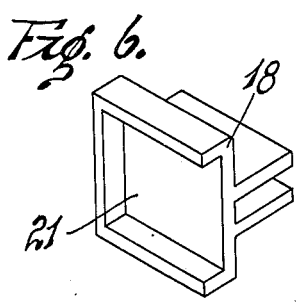
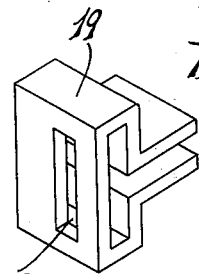
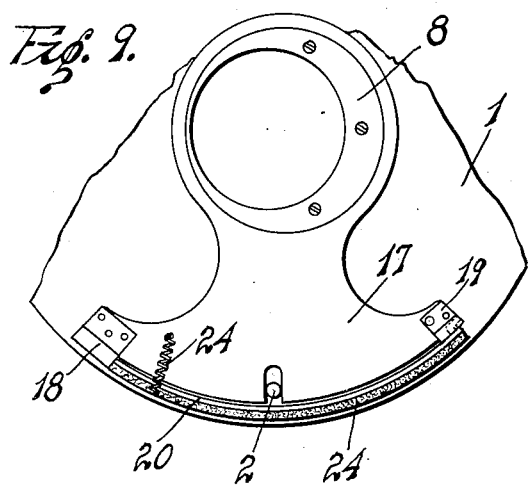
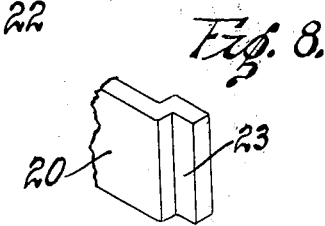
INVENTOR.
ALBERT F. ADKINS.
BY
ATTORNEY.

Patented Nov. 13, 1934

1,980,947

UNITED STATES PATENT OFFICE 1,980,947

EXPANDING BRAKE

Albert F. Adkins, Long Beach, Calif.

Application March 20, 1933, Serial No. 661,681

7 Claims. (Cl. 188—78)

This invention relates to an expanding brake, particularly applicable to motor vehicles, altho it might be used to equal advantage in other places requiring a releasable brake.

An object of my invention is to provide a brake having a plurality of brake shoes, said shoes being forced against the brake drum by manually actuated cams.

Another object of my invention is to provide an expanding brake, the lining of which is so moved against the brake drum that it will wear substantially evenly thruout its entire length and for that reason the lining will wear longer and substantially all of it can be used.

A further object is to provide a novel arrangement of brake actuating arms, said arms being simultaneously extended to press the brake shoes toward the brake drum.

A feature of my invention resides in the ease with which the brake shoes can be removed for relining and also the ease with which adjustments can be made to compensate for wear.

Other objects, advantages and features of invention may appear from the accompanying drawings, the subjoined detailed description and the appended claims.

In the drawings

Figure 1 is a plan view of the back plate and the actuating plate.

Figure 2 is a plan view of the assembled brake with the brake drum removed.

Figure 3 is a fragmentary transverse sectional view of my brake.

Figure 4 is a plan view of a three-shoe type of brake.

Figure 5 is a plan view of one of the eccentrics.

Figure 6 is a perspective view of a shoe clip.

Figure 7 is a perspective view of another clip used in connection with the clip shown in Figure 6.

Figure 8 is a fragmentary perspective view of a brake shoe utilized in connection with the clips shown in Figures 6 and 7.

Figure 9 is a fragmentary plan view of a modified form of shoe mounting.

Referring more particularly to the drawings, the numeral 1 indicates a stationary back plate which is attached to the rear axle housing, the front of an automobile spindle, or the like. A plurality of pins 2 is fixedly secured to the plate 1 and extending inwardly therefrom. There is one pin for each brake shoe and the purpose of these pins will be further described.

An actuating plate 3 is concentrically mounted upon an anti-friction bearing 4, said bearing being mounted upon the hub 5 of the plate 1. An arcuate slot 6 is cut in the back plate 1 and a finger 7 is attached to the actuating plate 3 and extends thru the slot 6. An actuating lever (not shown) is attached to the finger 7 and is actuated by the foot pedal of the vehicle in the usual and well known manner. As the brake pedal is depressed, the actuating plate 3 will be rotated around the hub 5.

A plurality of superimposed eccentrics 8 is detachably secured to the actuating plate 3. A brake operating arm 9 is mounted on each of the eccentrics 8, i. e., the eccentric is journaled in the brake operating arm and rotation of the eccentric will therefore cam the operating arm outwardly. Each of the arms is provided with a notch 10 on the outer edge thereof and one of the pins 2 extends into each of said notches. The purpose of this arrangement is to prevent rotation of the operating arms 9 but permits of radial movement of said arms.

A brake shoe 11 is mounted on each of the operating arms. These shoes are preferably attached by means of a single pin 12 which extends thru depending flanges 13 on the brake shoe and thru the operating arm 9.

By simply removing the pin 12, the brake shoes are released and can be removed for relining when necessary. The usual brake lining 14 is secured to the outer periphery of each of the brake shoes 11.

The operating arms 9 are all simultaneously urged outwardly in a radial direction and, due to the pivotal mounting of the brake shoes, the lining will come into full contact with the brake drum 15. This uniform contacting of the brake lining causes it to wear evenly thruout its entire length, resulting in greater efficiency for the brake and also longer life for the lining.

When wear occurs and it is necessary to adjust the brake, an additional hole 16 is provided in the actuating plate 3 and the finger 7 is merely moved back into the second hole, thus compensating for the wear. This adjustment serves to rotate the eccentrics 8 and will move the operating arms outwardly so as to move the shoes closer to the brake drum.

In the modified form of mounting shown in Figures 6 to 9, inclusive, the same eccentrics 8 are provided and are actuated in the same manner as previously described.

A brake operating arm 17 is journalled on the eccentric 8 and a pair of clips 18, 19, are attached to the outer edge thereof. The brake shoe 20 fits into the cup 21 in the one clip and into a hole 22 provided in the other clip. The end of the brake shoe is offset as shown at 23 so as to fit into the hole 22. A spring 24 holds the one end of the brake shoe in the cup 21. The usual lining 24 is secured to the shoe 20.

Having described my invention, I claim:

1. An expanding brake comprising a stationary plate, an actuating plate rotatably mounted on the first named plate, said first named plate having a slot therein, a finger protruding from the actuating plate thru the slot, a plurality of eccentrics on the actuating plate, an operating arm journaled on each of the eccentrics and a brake shoe secured to each of the operating arms.

2. An expanding brake comprising a stationary plate, an actuating plate rotatably mounted on the first named plate, said first named plate having a slot therein, a finger protruding from the actuating plate thru the slot, a plurality of eccentrics on the actuating plate, an operating arm journaled on each of the eccentrics, a brake shoe detachably secured to each of the operating arms, and guide means engaging each of the operating arms whereby said arms are held against rotation.

3. An expanding brake comprising a stationary plate, an actuating plate rotatably mounted on the first named plate, said first named plate having a slot therein, a finger protruding from the actuating plate thru the slot, a plurality of eccentrics on the actuating plate, an operating arm journaled on each of the eccentrics, a brake shoe detachably secured to each of the operating arms, guide means engaging each of the operating arms whereby said arms are held against rotation, a plurality of pins extending inwardly from the first named plate, each of said operating arms having a notch therein receiving one of the pins whereby the operating arms are held against rotation.

4. An expanding brake comprising a stationary plate, an actuating plate rotatably mounted on the stationary plate, means engaging the actuating plate whereby it is rotated, a plurality of superimposed eccentrics on the actuating plate, a brake operating arm journaled on each of the eccentrics, a brake shoe on each of the operating arms, and a pin extending thru the brake shoe and thru the operating arm whereby the shoe is detachably secured to the operating arm.

5. An expanding brake comprising a stationary plate, an actuating plate rotatably mounted on the stationary plate, means engaging the actuating plate whereby it is rotated, a plurality of superimposed eccentrics on the actuating plate, a brake operating arm journaled on each of the eccentrics, a brake shoe on each of the operating arms, a pin extending thru the brake shoe and thru the operating arm whereby the shoe is detachably secured to the operating arm, each of said operating arms having an elongated notch therein and a pin extending from the first named plate into said notch whereby the operating arms are held against rotation.

6. An expanding brake comprising a stationary plate, an actuating plate rotatably mounted on the first named plate, means engaging the actuating plate whereby it is rotated, a plurality of eccentrics on the actuating plate, an operating arm journaled in each of the eccentrics, a pair of clips attached to each arm, a brake shoe and means removably securing the brake shoe in the clips.

7. An expanding brake comprising a stationary plate, an actuating plate rotatably mounted on the first named plate, means engaging the actuating plate whereby it is rotated, a plurality of eccentrics on the actuating plate, an operating arm journaled in each of the eccentrics, a clip attached to each of the actuating arms, said clip having a cup therein, a second clip attached to each of the arms, said second clip having a hole therein, a brake shoe, one end of said brake shoe extending into said hole and the other end extending into said cup and a spring attached to one end of the brake shoe whereby it is held in the cup.

ALBERT F. ADKINS.